(12) United States Patent
Tseng et al.

(10) Patent No.: US 8,222,021 B2
(45) Date of Patent: Jul. 17, 2012

(54) SYSTEM AND PROCESS FOR TREATING WASTE GAS EMPLOYING BIO-TREATMENT TECHNOLOGY

(76) Inventors: Ching-Ping Tseng, Hsinchu (TW); Ying-Chien Chung, Hsin-Tien (TW)

( * ) Notice: Subject to any disclaimer, the term of this patent is extended or adjusted under 35 U.S.C. 154(b) by 1258 days.

(21) Appl. No.: 11/951,013

(22) Filed: Dec. 5, 2007

(65) Prior Publication Data

US 2008/0227181 A1    Sep. 18, 2008

Related U.S. Application Data

(62) Division of application No. 10/825,545, filed on Apr. 15, 2004, now abandoned.

(30) Foreign Application Priority Data

Apr. 29, 2003  (TW) ................. 92110021 A

(51) Int. Cl.
*C12S 5/00* (2006.01)
*C12M 1/16* (2006.01)
(52) U.S. Cl. ..................... 435/266; 435/299.1
(58) Field of Classification Search .............. 435/266, 435/299.1
See application file for complete search history.

(56) References Cited

U.S. PATENT DOCUMENTS

| 4,421,534 A | 12/1983 | Walker |
|---|---|---|
| 5,494,574 A | 2/1996 | Unterman et al. |

FOREIGN PATENT DOCUMENTS

| CA | 2035512 | 8/1991 |
|---|---|---|
| CA | 2186202 | 3/1998 |
| DE | 4102167 A1 | 7/1992 |
| DE | 4207233 A1 | 11/1993 |
| JP | 02031816 | 2/1990 |
| JP | 2002224207 | 8/2002 |

OTHER PUBLICATIONS

USPTO Office Action for Application No. 10825545 dated Jan. 11, 2008, 10 pages.
Barbosa, et al., "Activated sludge biotreatment of sulphurous waste emissions", Re/Views in Environmental Science & Bio/Technology 1: 345-362, 2002.
USPTO Office action issued in U.S. Appl. No. 10/825,545 dated Oct. 20, 2008, 16 pages.

*Primary Examiner* — William H Beisner
(74) *Attorney, Agent, or Firm* — Senniger Powers LLP

(57) ABSTRACT

A waste gas treatment process using biological treatment technology including filtering waste gas to be treated, and introducing the filtered waste gas into a biological treatment system periodically and switchably from two ends of the system.

2 Claims, 7 Drawing Sheets

SYSTEM AND PROCESS FOR TREATING WASTE GAS EMPLOYING BIO-TREATMENT TECHNOLOGY

CROSS REFERENCE

This a divisional of U.S. patent Ser. No. 10/825,545, filed Apr. 15, 2004, now abandoned, entitled, "System and Process for Treating Waste Gas Employing Bio-treatment Technology", which is hereby incorporated by reference.

BACKGROUND

The present invention relates to an improved waste gas treatment system and process.

Conventional biological technology for treating waste gas, such as a biofilter and a biotrickling filter, can only deal with the waste gas having little or no dust/grease. When the waste gas to be treated contains dust/grease, it will clog the biofilter, reduce the activity of the microorganisms (or activated sludge), cause the short flow of the reactor, increase the pressure loss, decrease the treating efficiency and shorten the service life of the bioreactor. Therefore, the conventional biological technology for treating waste gas is often limited to the application of treating waste gas in a specific field.

Nowadays the types for waste gas entering a bioreactor include "flow upward (i.e., flowing upward from the bottom of the reactor)" and "flow downward (i.e., flowing downward from the top of the reactor)." The type of "flow upward" can better control the pH value to avoid the phenomenon of acidification, and therefore maintain the higher activity of the microorganisms in the whole biofilter. However, for the type of "flow upward," it is not easy to control the humidity of the filter materials, which often causes the deficiency of the humidity for the filter materials at the inlet of the reactor. In addition, because the type of "flow upward" takes an opposite direction with respect to the normal water flow, the distribution of the gas flowing into the reactor is even worse, which will result in the phenomenon of short flow (i.e., the gas fails to flow through the whole cross section of the biofilter, but only flows through the passages having least resistance), and decrease the whole removal efficiency of the system. To the contrary, the type of "flow downward" can better control the humidity of the filter materials and perform a better distribution of the gas flow. However, because the type of "flow downward" takes a same flowing direction as the gravity, the filter materials can be denser, which increases the resistance for the gas flowing therethrough and therefore forms a greater pressure loss, and increases the operational cost and the maintenance cost of the inlet fan.

In addition, the numbers of the emission of the bioaerosol from the biofilter depends on the effects of the immobilization of the filter materials as employed (filled). For example, the numbers of the emission of the bioaerosol from a common peat biofilter can be up to $10^7$ CFU/m$^{3-}$ air, whereas that from an activated carbon biofilter can be $10^5$ CFU/m$^{3-}$ air, which is a little lower than the peat biofilter. If the microorganisms in the reactor are not microorganisms commonly seen indoors or outdoors, it may be harmful to the environment and even to the humanÿ s life when its numbers exceeds a certain extent.

SUMMARY

The present invention relates to a process of treating waste gas by means of biological treatment technology. The process comprises the steps of filtering waste gas to be treated; and introducing the filtered waste gas into a biological treatment system periodically and switchably from the two ends thereof.

The present invention employs a dust/grease filtering device, a two-way directional gas inlet system, a bioaerosol removal device, and a cell immobilized technology to overcome the above-mentioned drawbacks and improve the removal efficiency of the biofilter and solve the problem of the emission of the bioaerosol at the outlet, thereby increasing the activity of microorganisms and their residual ratio, as well as the overall treatment efficiency of the system.

DETAILED DESCRIPTION

Figure 1:
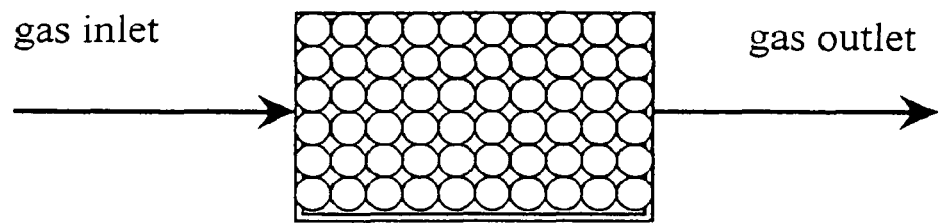
FIG. 1 is a schematic view showing the dust/grease filtering device.

In one embodiment of the present invention, the dust/grease filtering device (see FIG. 1), formed by the fillers giving pores being less than 100 mesh, is filled with a container or directly disposed in pipelines. The fillers can be shaped in beads, cylinders, sheets or other shapes. The fillers can be made of any material having capacity of absorbing or non-absorbing contamination. The fillers which are configured to form pores being less than 100 mesh are arranged for removing the majority of dust/grease and reduce the possible pressure drop.

Figure 2:
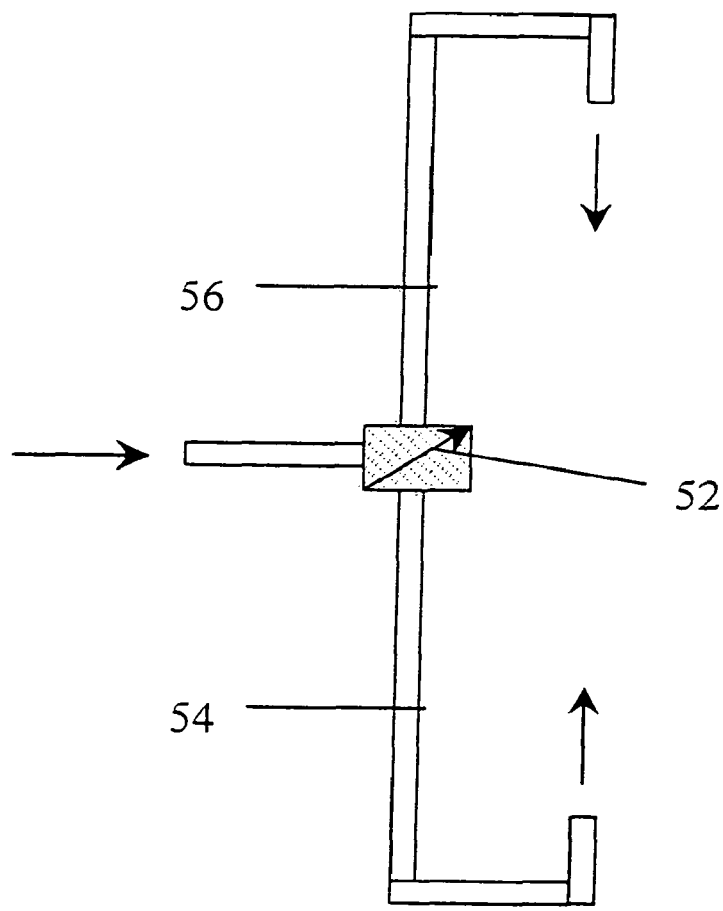
FIG. 2 is a schematic view showing the two-way directional gas inlet system.

Two-way directional gas inlet system (see FIG. 2) is primarily composed of a valve, an upward flow pipeline and a downward flow pipeline. Switching the valve can control the direction of gas flow in order to force the gas to flow upward or downward into the body of the reactor, of which taking either the "upward flow" or "downward flow" pipelines depends on the passages that the gas flows through. The valve can be switched manually, semi-electrically or fully-electrically. Any equipment, instruments or measures that can control the gas flow direction can be adopted. The material employed for construing the upward and downward pipelines can be plastic, iron, stainless steel, cement, etc.

Figure 3:
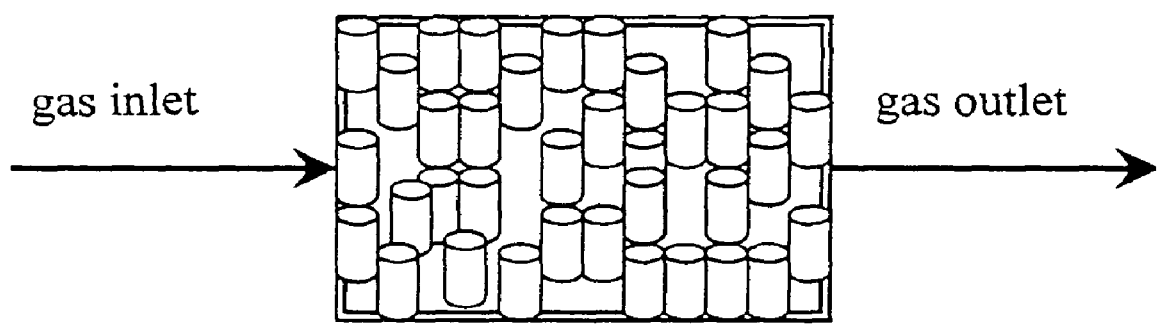
FIG. 3 is a schematic view showing the bioaerosol removal device.

The bioaerosol removal device (see FIG. 3) can be a thermal device, an ultraviolet light, or a container filled with material having sterilized effects, of which the filler can be in a powder shape, particles, column shape, or other appropriate shapes. If the filler itself does not come with sterilized ability, it can be immersed in a solvent being capable of killing or inhibiting microorganism. The filler is placed in the solvent and they are then placed in the bioaerosol removal device. The filler can preferably be zeolite, andesite, activated carbon, ferric hydroxide, activated bauxite, pearlite, polystyrene, peat, ceramic or compost. The solvent being capable of killing or inhibiting microorganism can be dioxygen chloride, bleacher, liquid chlorine, alcohol, acid, base, phenol, antibiotic or chloroamine.

The cell immobilization unit is a unit connecting microorganism and immobilized support by means of covalent bonding, adsorption, encapsulation, crosslinking, micro-particle encapsulation or other feasible mechanical or chemical measures. In the connection of covalent bonding, the material employed for the support can be, but is not limited to, porous glass, ceramic, stainless steel, gravel sand, synthetic polymer or metallic oxide. In the connection of adsorption, the support can be, but is not limited to, the material of activated carbon, peat, compost, bark, vermiculite, oyster shell, zeolite, andesite, activated bauxite, pearlite, polystyrene, synthetic material (e.g., polyethylene foam) cation exchange resin or anion exchange resin. In the connection of encapsulation, the support can be, but is not limited to, polyacrylamide, photo-crosslinking pre-polymer, urethane pre-polymer (e.g., ENT, ENTP, ENTB, PU) calcium alginae, aliginate derivatives, collagen, gelatin, bovine, albumin or agar. In the connection of crosslinking, the material employed for the support can be, but is not limited to, dimethyl-adipimidate, dimethyl suberimidate, aliphatic diamines or diamines (e.g., hexyl diamine). In the connection of micro-particle encapsulation, the method utilized therefore can be, but is not limited to, surface polymerization, liquid surface drying, phase separation, liposome encapsulation, hollow fiber encapsulation or the like.

Preferably, the microorganism adapted to the cell immobilization unit can be, but is not limited to, *Methanotrophic consortium, Methylcoccus capsulatus, Pseudomonas cepacia, Pseudomonas mendocina, Pseudomonas putida, Pseudomonas acidovorans, Pseudomonas pyocyanea, Pseudomonas fragi, Pseudomonas aeruginosa, Pseudomonas chiororaphis, Pseudomonas denitrificans, Nitrosomonas europaea, Nitrosomonas ciyotolerans, Nitrobacter agills, Nitrococcus mobilis, Nitrosospira multiformis, Nitrosococcus oceani, Suffolobus solfataricus, Suffolobus acidocaldarius, Suffolobus shibatae, Suffolobus hakonensis, Thiobacillus ferrooxidans, Thiobacillus neapolitanus, Thiobacillus denitrificans, Thiobacillus novellas, Thiobacillus intermedius, Thiobacillus thiooxidans, Thiobacillus thioparus, Thiobacillus versutus, Thiobacillus acidophilus, Thiosphaera pantotmpha, Sulfolobus acidocaldarius, Achromobacter sp., Arthrobacter sp., Aspergillus niger, Aspergillus sp., Arthrobacter globiformis, Acinetobacter calcoaceticus, Aeromonas sp., Alcailgenes eutrophus, Azotobacter sp., Bacillus sp., Bacillus gordonae, Bacillus sphaericus, Bacillus cereus, Bacillus subtilis, Beijerinckia sp., Brevibacterium sp., Amocbobacter pedioformis, Rhodococcus sp., Rhodospirillum rubrum, Chiamydomonas sp., Coniophora pueana, Cunninghamella elegans, Rhodospirillum fulvum, Frateuria sp., Mycobacterium sp., Neurosporia crassa, Rhodopseudomonas palustris, Rhodotorula glutinis, Rhodopseudomonas capsulatus, Rhodomicrobium vannielii, Chromatium glycolicum, Ectothiorhodospira mobilis, Thiocapsa litoralis, Chiorobium tepidum, Chiorofiexus aurantiacus, Trichoderma sp., Methanobacterium formicicum, Methanobacterium thermoalcallphllum, Methanosarcina barker, Desulfovibrio desulfuricans, Desuffotomaculum nigrificans, Nocardia sp., Paedllomyces sp., Penicillium sp., Tnchoderma virgatum, Trichoderma virid* and *Trichosporon cutaneum*. After cell immobilization, the waste gas treatment system is capable of increasing residue ratio of the microorganism in the biofilter, reducing emission of the bioaerosol and enhancing the treating efficacy of the system.

Figure 4:
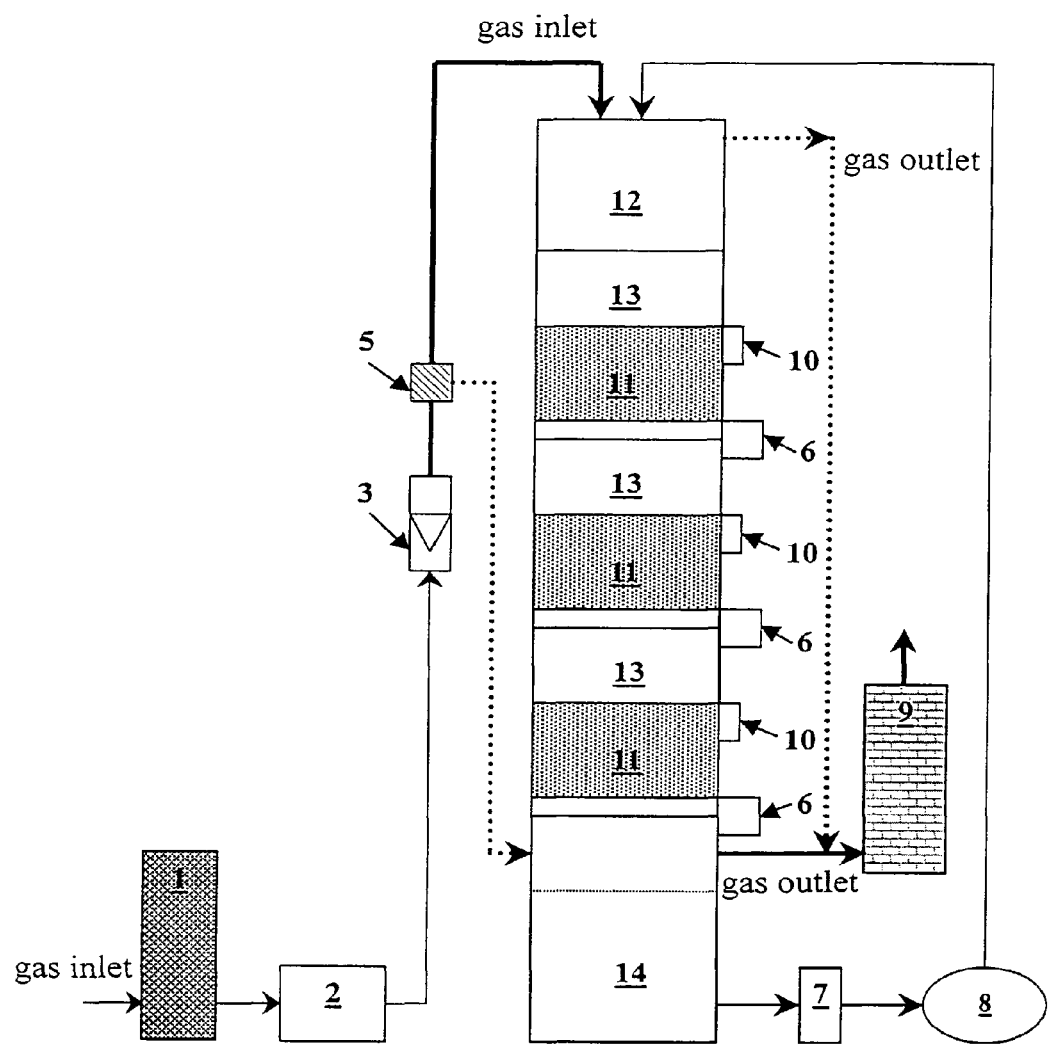
FIG. 4 is a schematic view showing a preferred embodiment of the claimed invention.

A preferred embodiment of the claimed invention is illustrated in FIG. 4, and comprises a conventional biotrickling filter system, in association with a dust/grease filtering device 1, a two-way directionally gas inlet system 5, a bioaerosol removal device 9 and a cell immobilization unit 11.

The conventional biotrickling filter system primarily includes a liquid spraying reservoir 12, a plurality biological reactors 13, a nutritional salt preserving reservoir 14 for furnishing nutrition that is required at the growth of microorganism. The periphery of the system includes a ventilating fan 2, a flow meter 3, pressure drop meters 6, a liquid filtering device 7, a liquid circulating flow water pump 8, sampling holes 10.

According to the preferred embodiment, the waste gas to be treated enters the dust/grease filtering device 1. By means of conveyance due to the ventilating fan 2, the waste gas is conveyed from the flow meter 3 and the two-way directional gas inlet system 5, through a valve control, and then into a top or bottom of the conventional biotrickling filter. The top and bottom of the filter are provided with gas outlets which connect, by pipelines, to the bioaerosol removal device 9. The waste gas as treated conveyed through the device 9 is then exhausted to the environment.

When being operated, the waste gas to be treated enters the dust/grease filtering device 1 by the suction of the ventilating fan 2. The dust and grease in the waste gas are efficiently removed. As such, the dust and grease accumulated in the ventilating fan 2 and the biological reactor connecting thereafter can also be reduced, thereby improving the waste gas treatment efficiency and the service life of the equipment.

The flow meter 3 connects to the ventilating fan 2. The detection of the status of the gas flowing in the pipelines by the pressure drop meter can monitor whether the reactor is blocked.

The two-way directional gas inlet system (see FIG. 2) primarily includes a direction-switchable valve 52, an upward pipeline 54, a downward pipeline 56, in which the gas flow can be guided into the upward pipeline 54 or the downward pipeline 56 by switching the direction of the valve 52. This embodiment adopts a directional switching mode. In operation, gas flows in a single (either upward or downward) direction first. After a certain operation time (possibly three to thirty days), the gas flow is switched to the another direction, also for a certain operation time (possibly three days to thirty days). Then the gas flow is switched back to the original direction. The procedure which is repeated in cycles can efficiently improve the disadvantages of the aforesaid single directional gas flow.

When the gas is under a downward flow mode, the gas flows from the spraying reservoir 12 at the top of the biotrickling filter, proceeds with biological reaction and chemical adsorption through a plurality of reactors 13, and then exhausts from the bottom of the biotrickling filter. To the contrary, when the gas is under an upward flow mode, the gas flows from the bottom of the biotrickling filter, proceeds with biological reaction and chemical adsorption through a plurality of reactors 13, and then exhausts from the top of the biotrickling filter.

The biotrickling filter is provided at its bottom with a nutrition salt preserving reservoir 14 for furnishing the growth of microorganism. By using the liquid circulating water pump 8, the nutrition is sipped to the top of the biotrickling filter through the liquid filtering device 7, and then furnished to each biological reactor 13 by gravity.

Some pipelines are provided at the top and bottom of the biotrickling filter in order to connect the outlets of the filter to the bioaerosol removal device 9. Regardless of that the gas is exhausted from the top or bottom of the biotrickling filter, the gas flow will be collected to the inlet of the bioaerosol removal device 9 and then into the device 9.

The microorganism providing biological reaction encapsulates or bonds the support in the biological reactors 13 of the biotrickling filter by means of the cell immobilization technology. Therefore, the microorganism lost together with the gas flow can be efficiently reduced, and the phenomenon of generating the bioaerosol can also be improved. When the gas flow exhausts from the biotrickling filter, only a very small numbers of bioaerosol can be detected. In the event that the gas flow is further filtered by the bioaerosol removal device, the waste gas exhausting into the environment hardly contains any bioaerosol.

Preferably, the introduction of waste gas into a biological treatment system, i.e., the biotrickling filter, is to form biofilter material such that the waste gas can be treated by the biofilter material before it enters the bioaerosol removal device. The so-defined biofilter material is the material in this field commonly called packing material, biological medium or biological support. Specifically, the formation of the biofilter material primarily includes the steps of: propagating and culturing a certain numbers of microorganism which has capability of decomposing the waste gas; forming aggregated or concentrated microorganism by centrifuging or concentrating the cultured microorganism; forming a mixture by pouring the aggregated or concentrated microorganism into a container having culture medium and mixing it with a support; and finally forming biofilter material having biofilm by the immobilization technology the mixture. Instead of the steps of propagating, culturing, and centrifuging/concentrating microorganism, the mixture can be alternatively formed by directly mixing pure bacteria species or an activated sludge.

In a further respect, the formation of the biofilter material can alternatively include the steps of:
  i. forming a first mixture in a first container by evenly mixing a medium with an isotonic solution, of which the medium includes microorganism having capability of decomposing the waste gas; forming a first aggregated or concentrated microorganism by centrifuging or concentrating the first mixture;
  ii. forming a second mixture in a second container by evenly mixing the first aggregated or concentrated microorganism with a first culture medium and a first contaminant till a certain numbers of the first contaminant is removed; forming a second aggregated or concentrated microorganism by centrifuging or concentrating the second mixture;
  iii. forming a third mixture in a third container by evenly mixing the second aggregated or concentrated microorganism with a second culture medium and a second contaminant till a certain numbers of the second contaminant removed;
  iv. forming a fourth mixture by repeating the above steps till no containment can be removed and then propagating and culturing the microorganism; forming a third aggregated or concentrated microorganism by centrifuging or concentrating the fourth mixture;
  v. forming a fifth mixture in a fourth container by evenly mixing the third aggregated or concentrated microorganism with a second isotonic solution;
  vi. diluting the fifth mixture and inoculating it in a container having a fourth culture medium; forming a sixth mixture by inoculating a colony in a container having a fifth culture medium, of which the colony is picked from one having a maximum number of identical colonies by using inoculating loops, till the sixth mixture has a number of microorganism up to $10^{7}$–$10^{10}$ CFU/ml; forming a fourth aggregated or concentrated microorganism by centrifuging or concentrating the sixth mixture; and forming the biofilter material having biofilm by placing the fourth aggregated or concentrated microorganism in a container having a sixth culture medium, and adding a support therein, of which the sixth culture medium has a number being capable of covering the support.

Figure 5:
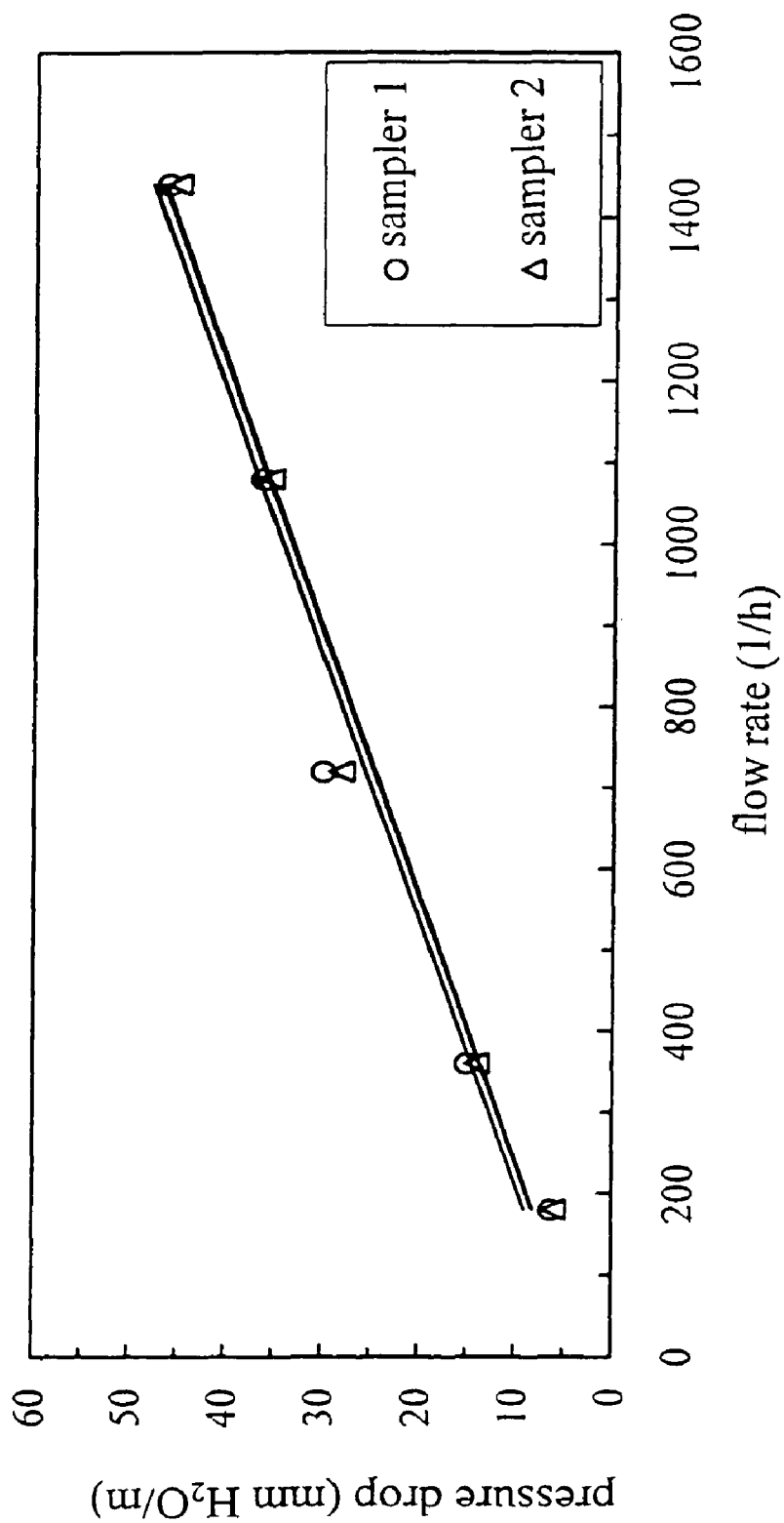
FIG. 5 is a diagram showing the pressure drop of an actual biotrickling filter using the dust/grease filtering device.
Figure 6:
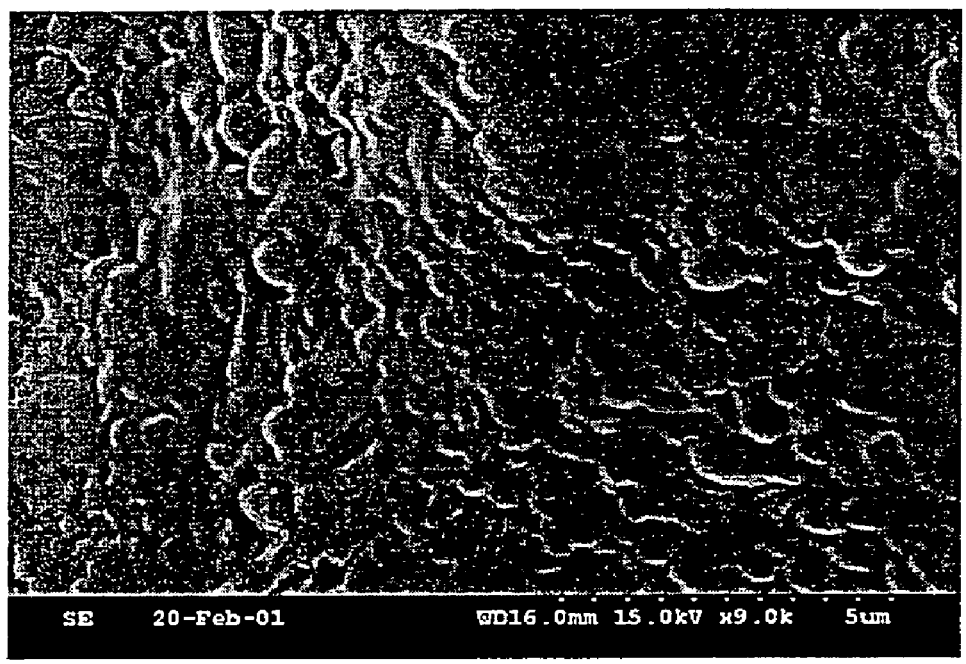
FIG. 6 is an electromicroscopic photograph of biofilm in an actual biotrickling filter using the dust/grease filtering device.

Superior effects have been proved after the above-mentioned improved biotrickling filter has been subject to practical tests. The details of the experiment are described as follows:

In practical implementation, FIG. 5 shows the variation of the pressure drop of actual biotrickling filter using the dust/grease filtering device for 240 operation days. It can be learned from the figure that the measured value of the pressure drop is 8-50 mm $H_2O$/m, which is far lower than the value of 300 mm $H_2O$/m measured from the conventional biofilter. It can be further learned from the electromicroscopic picture of biofilm in FIG. 6 that the formation of the biofilm is excellent without depositing any dust/grease particles by employing the biotrickling filter, which utilizes the dust/grease filtering device, for a 240-day operation time.

Figure 7:
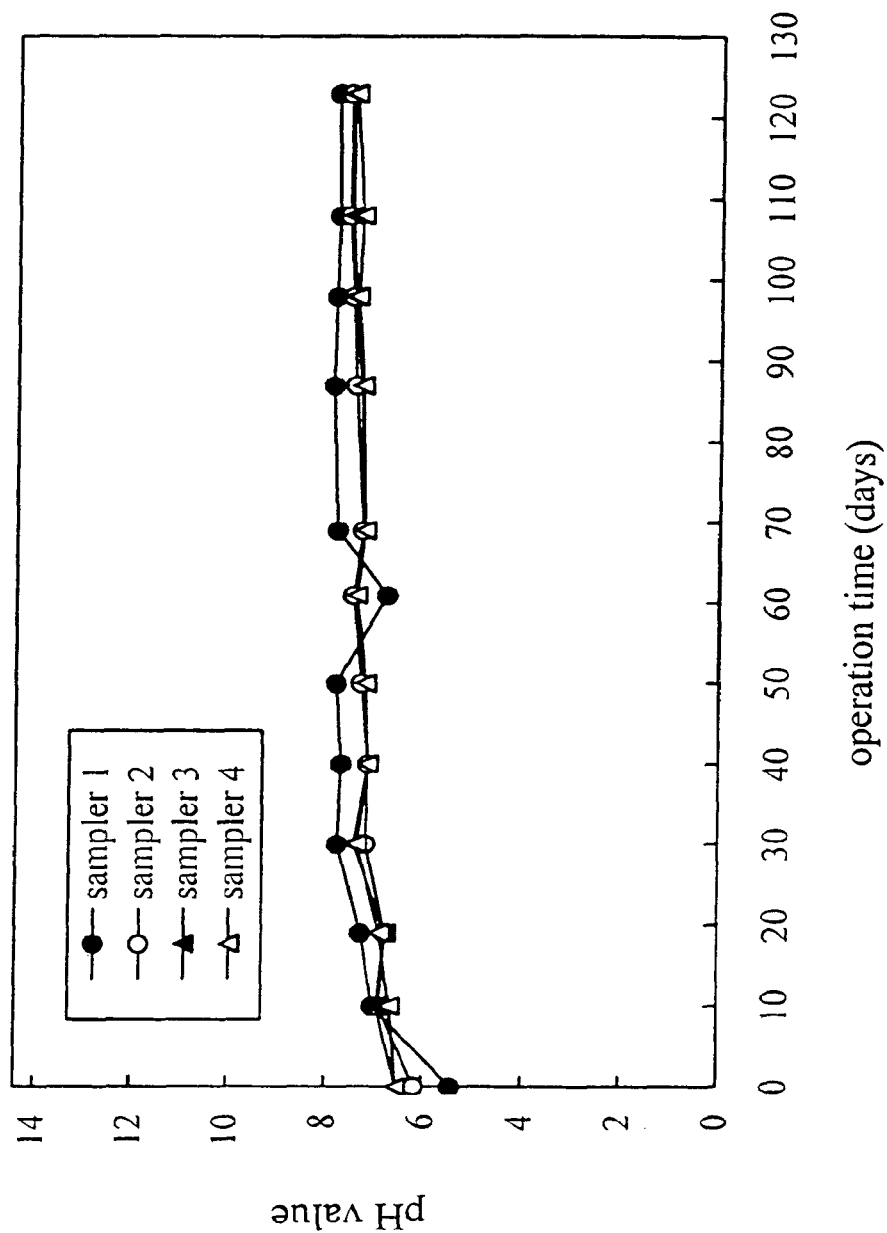
FIG. 7 is a diagram showing the variation of pH value of an actual biotrickling filter using two-way directional gas inlet system.
Figure 8:
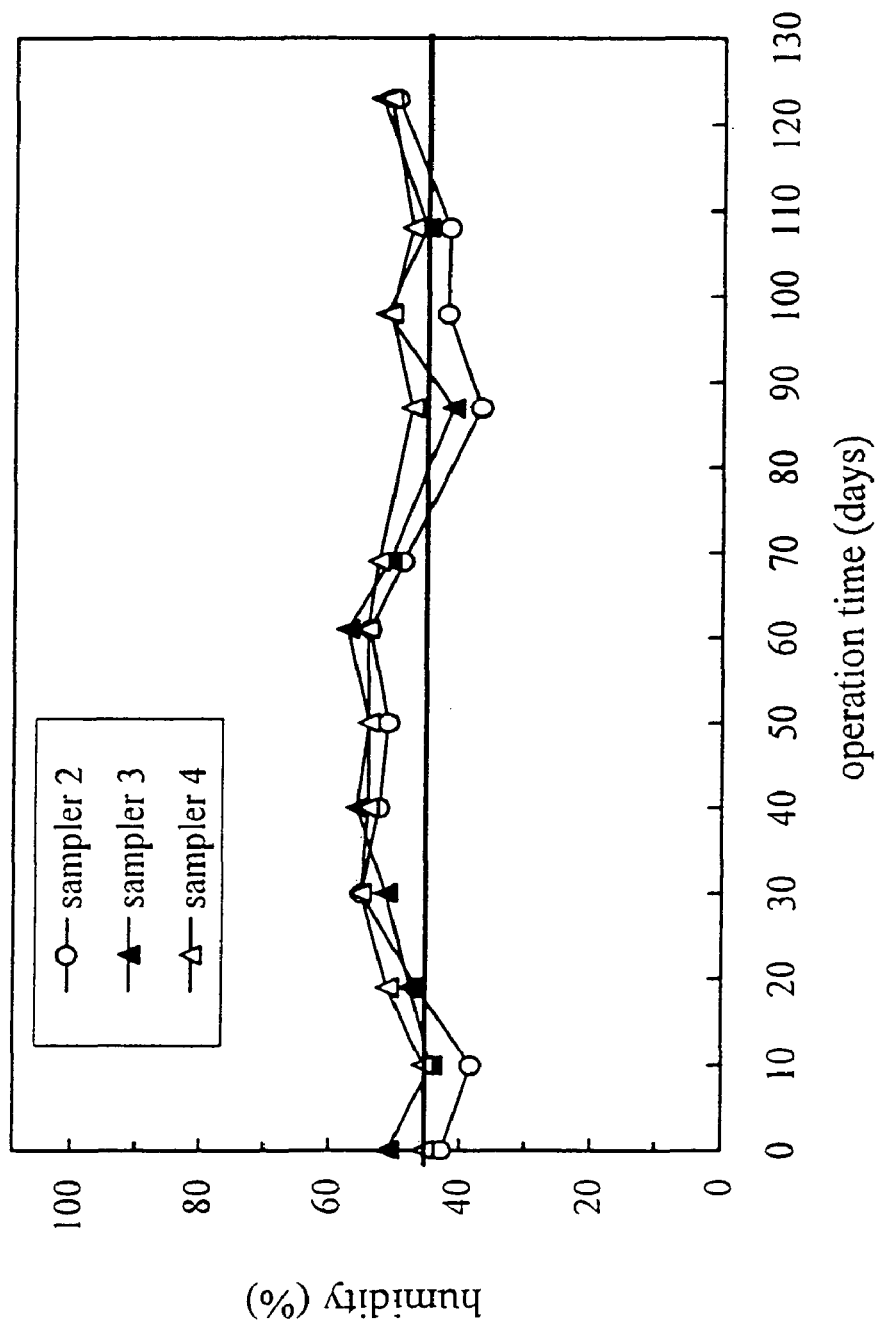
FIG. 8 is a diagram showing the variation of humidity of an actual biotrickling filter using two-way directional gas inlet system.

FIG. 7 shows the variation of pH value which is controlled within the range of 7±1 with respect to biofilter samplers at different filter depths by using an actual biotrickling filter which employs the two-way directional gas inlet system, for a 123-day operation time. It reveals that the pH value is well controlled. FIG. 8 shows the variation of humidity which is controlled within the range of 45%±5% with respect to biofilter samplers at different filter depths by using an actual biotrickling filter which employs the two-way directional gas inlet system, also for a 123-day operation time. It also reveals that the humidity is well controlled.

Table I shows the implementation of an actual biotrickling filter using the bioaerosol removal device. The filler as used in the bioaerosol removal device is ceramic being 4 cm in length, 2 cm in inner diameter, 3 cm in outer diameter and having a hollow cylindrical shape and white color. A certain numbers of the ceramic filler is immersed 1% bleach for 12 hours, and then disposed in the bioaerosol removal device in association with an biological reactor of inoculated with heterotrophic bacteria. The gas retention time is controlled at a time of 30 and 45 seconds. Then the measurement is commenced. The medium for measuring the numbers of the microorganism is "Nutrient Agar (NA)," which is primarily used for measuring the heterotrophic microorganism at the outlet of the biological reactor. The measured background value of the environmental bioaerosol is approximately $7.4 \times 10^{5}$–$8.9 \times 10^{5}$ CFU/$m^{3}$ air. In the bioaerosol removal device which is only provided with filler, the numbers of the bioaerosol emitting from the system is approximately $6.6 \times 10^{4}$–$8.2 \times 10^{4}$ CFU/$m^{3}$ air. If the filler is immersed in distilled water for treatment, the bioaerosol is slightly reduced, whereas if the filler is immersed in bleach commonly sold in the market, there will be no bioaerosol which can be detected at the gas outlet. The bioaerosol removal efficiency is capable of being up to 99.9% according to a determined limit. Therefore, the bioaerosol removal device can definitely reduce or eliminate the emission of the bioaerosol, thereby significantly enhancing the safety and application field of a waste gas biological treatment system.

TABLE I

| Treatment Gas Retention Time | Control 1 (Environmental Background Value) | Control 2 (Filler without any Treatment) | Filler Immersed in Distilled Water | Filler Immersed in Bleach |
|---|---|---|---|---|
| 30 sec | $7.4 \times 10^5$ | $8.2 \times 10^{4*}$ | $2.6 \times 10^3$ | ND** |
| 45 sec | $8.9 \times 10^5$ | $6.6 \times 10^4$ | $1.7 \times 10^3$ | ND |

*Numbers of bioaerosol as generated (CFU/$m^{3-}$air);
**ND <58 CFU/$m^{3-}$air

Table 2 shows the difference in treating waste gas containing hydrogen sulphide between with and without cell immobilization treatment when the bioaerosol removal device is not introduced. In the generating numbers of the bioaerosol, there is $3.6 \times 10^{4-}$ $6.2 \times 10^5$ CFU/$m^3$ air bioaerosol emitting from the system without the cell immobilization treatment; whereas there is less than 100 CFU/$m^{3-}$ air which can be measured with the cell immobilization treatment. The outcome reveals that depending on the operation duration, the cell residue numbers and treatment efficiency, with the cell immobilization technology, is much higher than those without such technology.

TABLE 2

| | $1^{st}$ day | | $45^{th}$ day | | $90^{th}$ day | |
|---|---|---|---|---|---|---|
| | without immobilization | with immobilization | without immobilization | with immobilization | without immobilization | with immobilization |
| Cell Residue Numbers | $7.3 \times 10^8$ | $7.6 \times 10^8$ | $7.4 \times 10^6$ | $6.2 \times 10^8$ | $3.2 \times 10^5$ | $6.8 \times 10^8$ |
| Bioaerosol Numbers | $6.2 \times 10^5$ | ND | $3.6 \times 10^4$ | ND | $5.8 \times 10^4$ | 96 |
| Treatment Efficiency | 90% | 99% | 85% | 99% | 83% | 99% |

Cell Residue Numbers (CFU/L-reactor), Bioaerosol Generating Numbers (CFU/$m^{3-}$ air), ND < 12 CFU/$m^{3-}$ air.

The above actual experiment reveals that this biological waste gas treatment system, as compared with the conventional one, makes significant improvements in respect of pressure drop, accumulation of dust and grease, control of the variation of the pH value of bio-filter material and humidity, and the bioaerosol contents after the waste gas is treated. Specifically, applying the dust/grease filtering device, two-way directional gas inlet system, bioaerosol removal device, and cell immobilization technology to an existing biological waste gas treatment reactor results in the following advantages: (1) enhancing treatment efficiency, (2) reducing pressure drop, (3) prolonging service life of the system, (4) reducing the emission of bioaerosol, (5) increasing the application field of the system, and (6) improving the safety of the biotrickling filter.

The detailed technology and preferred embodiments implemented for the subject invention are described in the following paragraphs accompanying the appended drawings for people skilled in this field to well appreciate the features of the claimed invention.

The above disclosure is related to the detailed technical contents and inventive features thereof. People skilled in this field may proceed with a variety of modifications and replacements based on the disclosures and suggestions of the invention as described without departing from the characteristics thereof. For example, selectively or partially utilizing switchable flowing direction and the bioaerosol removal technology can also fall within the scope sought to be patented. Although such modifications and replacements are not fully disclosed in the above descriptions, they have been substantially covered in the following claims as appended.

What is claimed is:

1. A waste gas treatment process using biological treatment technology, comprising:
    filtering waste gas to be treated; and
    introducing the filtered waste gas into a biological treatment system periodically and switchably from two ends thereof;
    wherein the step of introducing a waste gas into a biological system further includes forming biofilter material, and the step of forming biofilter material includes:
    forming a first mixture in a first container by evenly mixing a medium with an isotonic solution, of which the medium includes microorganism having capability of decomposing the waste gas;
    forming a first aggregated microorganism by centrifuging the first mixture;
    forming a second mixture in a second container by evenly mixing the first aggregated microorganism with a first culture medium and a first contaminant until a certain numbers of the first contaminant being removed;
    forming a second aggregated microorganism by centrifuging the second mixture;
    forming a third mixture in a third container by evenly mixing the second aggregated microorganism with a second culture medium and a second contaminant until a certain numbers of the second contaminant being removed;
    forming a fourth mixture by repeating the above steps until no containment being can be removed and then propagating and culturing the microorganism;
    forming a third aggregated microorganism by centrifuging the fourth mixture;
    forming a fifth mixture in a fourth container by evenly mixing the third aggregated microorganism with a second isotonic solution;
    diluting the fifth mixture and inoculating it in a container having a fourth culture medium;
    forming a sixth mixture by inoculating a colony in a container having a fifth culture medium, of which the colony is picked from one having a maximum number of identical colonies by using inoculating loops, until the sixth mixture has a number of microorganism up to 107 to 1010 CFU/ml;
    forming a fourth aggregated microorganism by centrifuging the sixth mixture; and
    forming the biofilter material having biofilm by placing the fourth aggregated microorganism in a container having a sixth culture medium, and adding a support therein.

2. A waste gas treatment process using biological treatment technology, comprising:
- filtering waste gas to be treated; and
- introducing the filtered waste gas into a biological treatment system periodically and switchably from two ends thereof;
- wherein the step of introducing a waste gas into a biological system further includes forming biofilter material, and the step of forming biofilter material includes:
- forming a first mixture in a first container by evenly mixing a medium with an isotonic solution, of which the medium includes microorganism having capability of decomposing the waste gas;
- forming a first concentrated microorganism by concentrating the first mixture;
- forming a second mixture in a second container by evenly mixing the first concentrated microorganism with a first culture medium and a first contaminant until a certain numbers of the first contaminant being removed;
- forming a second concentrated microorganism by concentrating the second mixture;
- forming a third mixture in a third container by evenly mixing the second concentrated microorganism with a second culture medium and a second contaminant until a certain numbers of the second contaminant being removed;
- forming a fourth mixture by repeating the above steps until no containment being can be removed and then propagating and culturing the microorganism;
- forming a third concentrated microorganism by concentrating the fourth mixture;
- forming a fifth mixture in a fourth container by evenly mixing the third concentrated microorganism with a second isotonic solution;
- diluting the fifth mixture and inoculating it in a container having a fourth culture medium;
- forming a sixth mixture by inoculating a colony in a container having a fifth culture medium, of which the colony is picked from one having a maximum number of identical colonies by using inoculating loops, until the sixth mixture has a number of microorganism up to $107 \times 1010$ CFU/ml;
- forming a fourth concentrated microorganism by concentrating the sixth mixture; and
- forming the biofilter material having biofilm by placing the fourth concentrated microorganism in a container having a sixth culture medium, and adding a support therein.

\* \* \* \* \*